July 22, 1947.
A. UTSCH
2,424,521
AIRPLANE WING SPAR JOINT
Filed Oct. 8, 1943
2 Sheets-Sheet 1
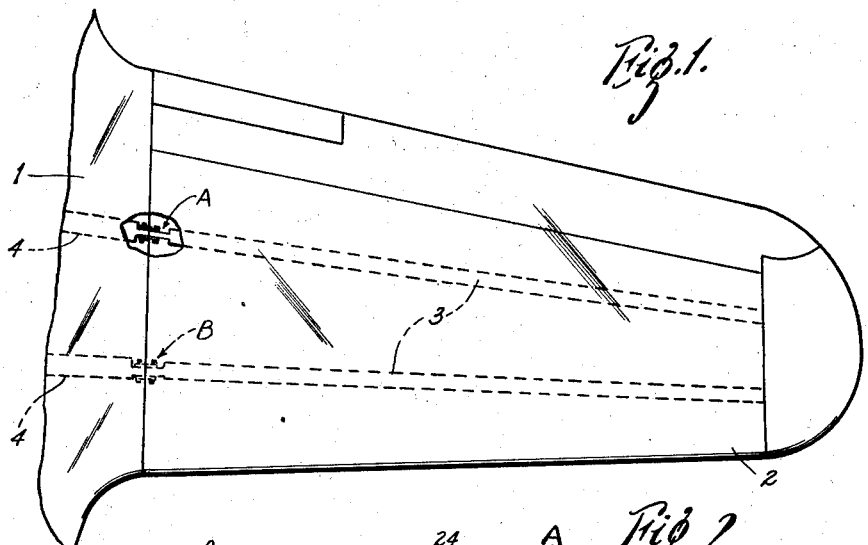
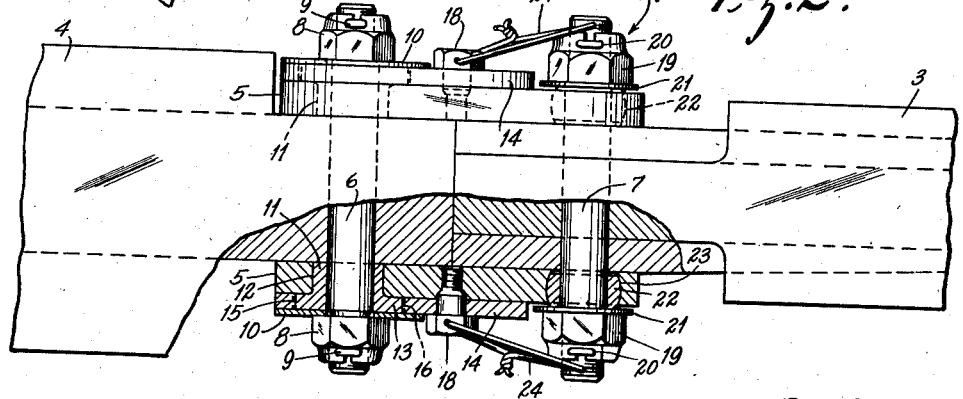
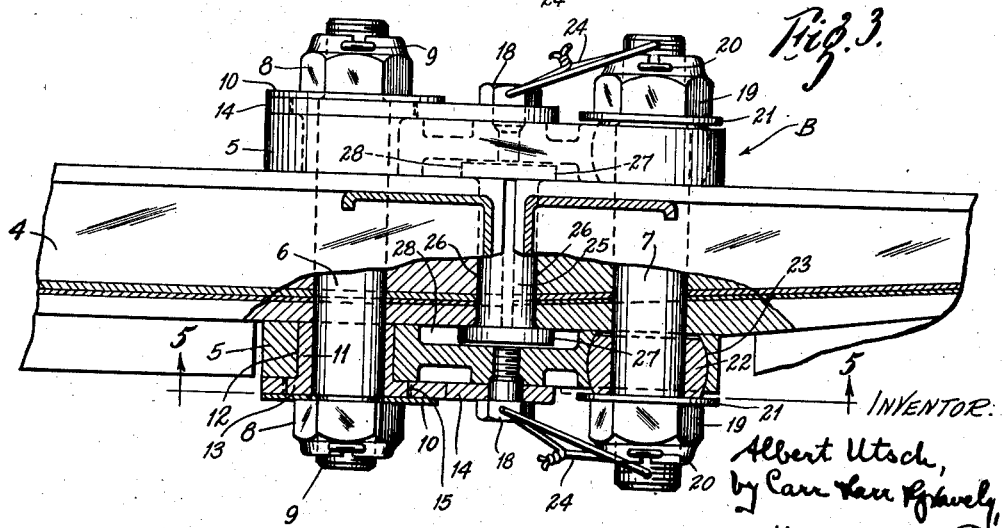
INVENTOR:
Albert Utsch,
by Carr Carr Gravely
his ATTORNEYS.

July 22, 1947.   A. UTSCH   2,424,521
AIRPLANE WING SPAR JOINT
Filed Oct. 8, 1943   2 Sheets-Sheet 2
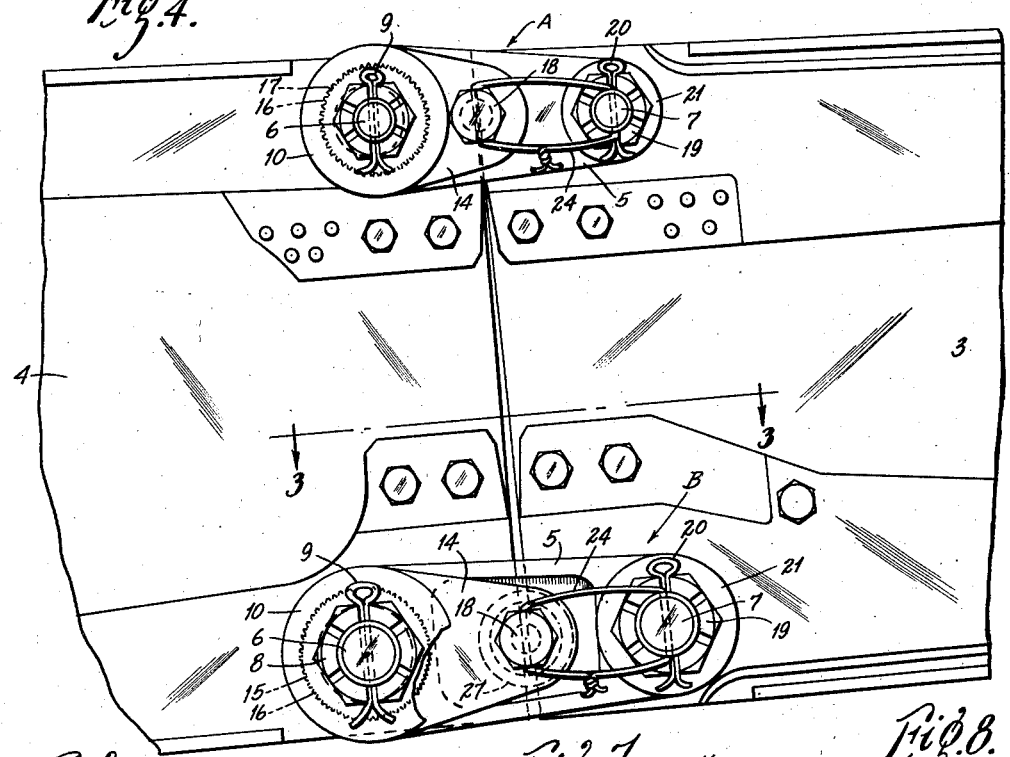
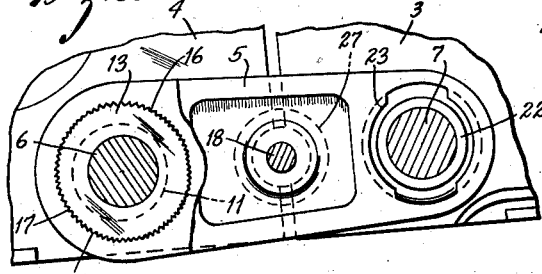
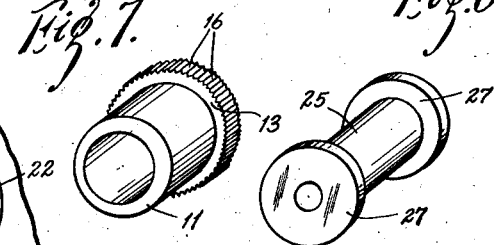
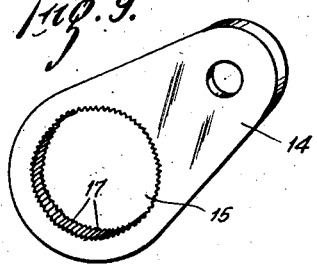
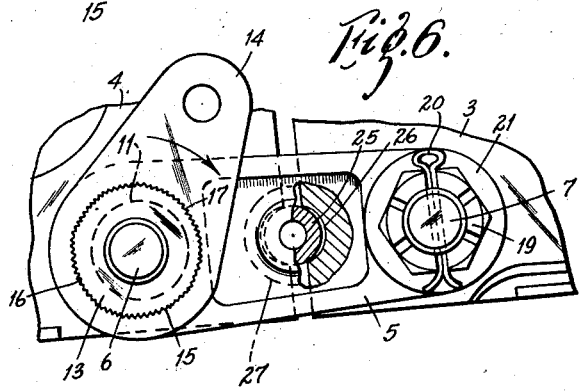
INVENTOR:
Albert Utsch,
by Carr Carr Gravely,
His ATTORNEYS.

Patented July 22, 1947

2,424,521

UNITED STATES PATENT OFFICE 2,424,521

AIRPLANE WING SPAR JOINT

Albert Utsch, Normandy, Mo., assignor to McDonnell Aircraft Corporation, St. Louis, Mo., a corporation of Maryland Application October 8, 1943, Serial No. 505,477

12 Claims. (Cl. 287—9)

This invention relates principally to joints for connecting the spars of the detachable outboard section of an airplane wing to the inboard section thereof. The invention has for its principal object to devise a simple and economical, strong and rigid light-weight spar joint that can be readily adjusted to compensate for misalinement and variations in the shape and dimensions of the cooperating parts due to damage thereto and adverse tolerances; that can be quickly and easily connected and disconnected in the field without factory equipment; and that will increase the shear resistance of the joint. The invention consists in the airplane wing spar joint and in the construction, combinations and arrangements of parts hereinafter described and claimed.

In the accompanying drawings, which form part of this specification and wherein like symbols refer to like parts wherever they occur, Fig. 1 is a plan view of a portion of an airplane wing provided with wing spar joints embodying my invention.

Fig. 2 is an enlarged fragmentary plan view of the connected end portions of the inboard and outboard wing spars, the upper connection being shown partly in horizontal section, Fig. 3 is a view similar to Fig. 2 showing the lower connection partly in horizontal section, Fig. 4 is a fragmentary side elevational view of the connected end portions of the inboard and outboard wing spars, Fig. 5 is a vertical sectional view on the line 5—5 in Fig. 3, Fig. 6 is a view similar to Fig. 5, showing the operating arm on the eccentric bushing and the nut on the outboard bolt, Fig. 7 is a perspective view of one of the eccentric bushings, Fig. 8 is a perspective view of the shear pin element of the lowermost connection; and Fig. 9 is a perspective view of one of the adjusting arms for the eccentric bushings.

In the accompanying drawings, my invention is shown embodied in an airplane wing comprising an inboard section 1 and an outboard section 2 that is detachable from said inboard section for replacement and for convenience in storing and shipping. The inboard wing section 1 is provided with spars 4 and the outboard section 2 is provided with spars 3 that are rigidly connected in alining relation to the corresponding inboard wing spars by a joint comprising upper and lower connections A and B, respectively, the same reference characters designating similar parts of each of said connections.

Each of the connections A and B comprises two splice bars or links 5 that span the abutting ends of the inboard and outboard wing spars and are rigidly secured flatwise to opposite sides of corresponding corner portions thereof by horizontal inboard and outboard bolts 6 and 7, respectively. The inboard bolt 6 extends through registering holes in the inboard wing spar 4 and splice bars 5 and is provided at each end with a castellated nut 8 that is locked to said bolt preferably by means of a cotter pin 9. The nut 8 bears against a washer 10 that seats against the outer end of an eccentric bushing 11 that is sleeved on the inboard bolt 6 and is rotatably mounted in the cylindrical inboard bolt hole 12 in the adjacent splice bar 5. The eccentric bushing 11 has an outstanding circumferential flange 13 at the outer end thereof that is located between the washer 10 and the outer side face of the splice bar 5.

An operating arm 14 has an opening 15 in the hub portion thereof that fits the flanged outer end 13 of the eccentric bushing 11. The operating arm 14 is held in place on the end flange 13 of the eccentric bushing 11 by means of the washer 10; and said end flange is provided with a series of fine peripheral serrations 16 that interlock with a similar series of serrations 17 in the opening 15 in the hub of said operating arm, whereby said bushing may be rotated by said arm in the inboard bolt hole 12 in the splice bar 5 relative to the inboard bolt 6 and said operating arm may be angularly adjusted with relation to said bushing. The operating arm 14 is locked to the splice bar in the desired position of rotary adjustment by means of a cap screw 18 that extends through the free outer end of said arm and is threaded into said splice bar 5.

The outboard bolt 7 of each of the connections A and B extends through registering openings provide therefor in the outboard wing spar 3 and the splice bars 5 on opposite sides thereof and is provided at each end with a castellated nut 19 that is locked to said bolt by means of a cotter pin 20. The nut bears against a washer 21 that seats against the outer end of a convex spherical bushing 22 that is sleeved on the outboard bolt 7 and is supported in the concave spherical surface provided therefor in the outboard bolt opening 23 in the link 5. The cap screw 18, which locks the bushing adjusting arm 14 to the splice bar 5, is locked in tightened position by means of a wire loop 24 that extends through the head of said cap screw and the outer end of the outboard bolt 7 and has its ends twisted together.

As shown in the drawings, one of the connections A and B, preferably the lowermost connection B, is provided with means for increasing the shearing resistance thereof. This shear resisting means preferably comprises a hollow cylindrical shear pin 25 that seats within opposed transverse grooves 26 provided therefor in the opposing end faces of the inboard and outboard wing spars opposite the splice bars 5 and terminates in outstanding end thrust flanges 27 that abut against the outer side faces of said wing spars. As shown in Fig. 3, the splice bars 5 of the lowermost connection B have their inner side faces recessed, as at 28, to accommodate the adjacent end thrust flange 27 of the shear pin 25.

The hereinbefore described wing spar joint construction has numerous important advantages. The two connections A and B forming the complete wing spar joint are each separately assembled, adjusted and disassembled in the same manner and permit the outboard wing spars 3 to be quickly and easily attached to and detached from the inboard wing spars 4. The eccentric bushings 11 at opposite ends of the inboard bolts 6 are independently adjustable by means of their operating arms 14 to take up all play in the mating parts due to damage thereto or large manufacturing tolerances and to properly tension each splice bar 5 so as to pre-stress the joint and thus avoid unnecessary motion of the wing tips in landing, take-offs and maneuvers. The spherical bushings 22 at opposite ends of the outboard bolts 7 accommodate any misalinement of the connected wing spar ends; and the shear pin 25 in the lower connection B prevents relative vertical movement of the connected wing spars and thus takes the vertical shear load while the end flanges of said pin serve to prevent the same from slipping endwise from the notches in the opposing ends of said wing spars during the operation of assembling the joint. Repair outboard wing sections may be readily secured to the original inboard wing sections and the spar joints properly tensioned in the field without factory equipment despite lack of fit of the repair section with the original section. The splice bar can be placed under equal tension by turning the operating arms for the eccentric bushing, after which the arms are detached from the bushings and replaced in position for locking to the splice bars by means of the lock screws 18.

Obviously, the joint construction hereinbefore described admits of considerable modification without departing from my invention and is applicable to sectional airfoils of various types.

What I claim is:

1. An airfoil spar joint construction comprising two spars disposed in end to end relation, splice bars disposed on opposite sides of said spars and spanning the adjacent ends thereof, and separate connections between said splice bars and the respective spars, one of said connections including separate means cooperating with each of said splice bars for taking up play in said joint and for separately tensioning each of said splice bars.

2. An airfoil spar joint construction comprising two spars disposed in end to end relation, splice bars disposed on opposite sides of said spars and spanning the adjacent ends thereof, and separate connections between said splice bars and the respective spars, one of said connections including means for accommodating misalinement of the spars and the other of said connections including means for separately adjusting each of said splice bars relative to said spars to take up play in said spar joint and to tension said splice bars.

3. An airfoil spar joint construction comprising two spars disposed in end to end relation, splice bars disposed on opposite sides of said spars and spanning the adjacent ends thereof, said spars having opposed transverse grooves in said ends thereof, and separate connections between said splice bars and the respective spars, one of said connections including means for accommodating misalinement of the spars and the other of said connections including means for separately adjusting each of said splice bars relative to said spars to take up play in said spar joint and to tension said splice bars, and a shear pin seating in said opposed grooves in said ends of said spars and having flanges overlapping the side faces thereof.

4. An airplane wing spar joint construction comprising two wing spars disposed in end to end relation, splice bars disposed on opposite sides of said wing spars and spanning the adjacent ends thereof, and releasable connections between each of said splice bars and the respective spars, the connection between each splice bar and one of said spars being adjustable for taking up play in said joint and for tensioning said splice bar, and the connection between each splice bar and the other of said spars being self-adjustable to accommodate misalinement of said spars.

5. An airplane wing spar joint construction comprising inboard and outboard wing spars disposed in end to end relation, splice bars disposed on opposite sides of said wing spars and spanning the adjacent ends thereof, said inboard spar and the inboard ends of said splice bars having registering openings therein, a bolt extending through said registering openings, eccentric bushings sleeved on said bolt and rotatable in the openings provided therefor in said splice bars, and means associated with said eccentric bushings for rotating them relative to said bolt and splice bars to take up play in said joint.

6. An airplane wing spar joint construction comprising inboard and outboard wing spars disposed in end to end relation, splice bars seating against opposite sides of said wing spars and spanning the adjacent ends thereof, said inboard spar and the inboard ends of said splice bars having registering openings therein, a bolt extending through said registering openings, eccentric bushings sleeved on said bolt and rotatable in the openings in said splice bars, and means associated with said eccentric bushings for rotating them relative to said bolt and splice bars to take up play in said joint, said means comprising an arm fixed to each of said bushings.

7. An airplane wing spar joint construction comprising inboard and outboard wing spars disposed in end to end relation, splice bars disposed on opposite sides of said wing spars and spanning the adjacent ends thereof, said adjacent ends of said wing spars having openings therein and said splice bars having openings in the ends thereof registering with the respective wing spar openings, the openings in the outboard ends of said splice bars having spherical surfaces, a bolt extending through the registering openings in said inboard wing spar and the inboard ends of said splice bars, eccentric bushings sleeved on said bolt and rotatable in the openings in the inboard ends of said splice bars, means associated with said eccentric bushings for rotating them relative to said bolt and splice bars to take up play in said joint, a bolt extending through the registering openings in said outboard spar and in the outboard ends of said splice bars, and spherical bushings sleeved on said outboard bolt and corresponding with the spherical surfaces in the outboard bolt receiving openings in the respective splice bars.

8. An airplane wing spar joint construction comprising inboard and outboard wing spars disposed in end to end relation, splice bars disposed on opposite sides of said wing spars and spanning the adjacent ends thereof, said adjacent ends of said wing spars having openings therein and said splice bars having openings in the ends thereof registering with the respective wing spar openings, the openings in the outboard ends of said splice bars having spherical surfaces, a bolt extending through the registering openings in said inboard wing spar and the inboard ends of said splice bars, eccentric bushings sleeved on said bolt and rotatable in the openings in the inboard ends of said splice bars, means associated with said eccentric bushings for rotating them relative to said bolt and splice bars to take up play in said joint, a bolt extending through the registering openings in said outboard spar and in the outboard ends of said splice bars, spherical bushings sleeved on said outboard bolt and cooperating with the spherical surfaces in the outboard bolt receiving openings in the respective splice bars, and a shear pin having a body portion interposed between the opposed ends of said wing spars and outstanding end flanges disposed in abutting relation to the opposite side faces thereof.

9. An airplane wing spar joint construction comprising inboard and outboard wing spars disposed in end to end relation, splice bars disposed on opposite sides of said wing spars and spanning the adjacent ends thereof, said adjacent ends of said wing spars having openings therein and said splice bars having openings in the ends thereof registering with the respective wing spar openings, the openings in the outboard ends of said splice bars having spherical surfaces, a bolt extending through the registering openings in said inboard wing spar and the inboard ends of said splice bars, eccentric bushings sleeved on said bolt and rotatable in the openings in the inboard ends of the respective splice bars, a bolt extending through the registering openings in said outboard spar and in the outboard ends of said splice bars, and spherical bushings sleeved on said outboard bolt and cooperating with the spherical surfaces in the outboard bolt receiving openings of the respective splice bars.

10. An airplane wing spar joint construction comprising inboard and outboard wing spars disposed in end to end relation, splice bars disposed on opposite sides of said wing spars and spanning the adjacent ends thereof, said adjacent ends of said wing spars having openings therein and said splice bars having openings in the ends thereof registering with the respective wing spar openings, the openings in the outboard ends of said splice bars having spherical surfaces, a bolt extending through the registering openings in said inboard wing spar and the inboard ends of said splice bars, eccentric bushings sleeved on said bolt and rotatable in the openings in the inboard ends of said splice bars, said bushings having serrated outer end portions, arms having serrated openings adapted to interlock with the serrated ends of the respective bushings, means for locking said arms to said splice bars, a bolt extending through the registering openings in said outboard spar and in the outboard ends of said splice bars, spherical bushings sleeved on said outboard bolt and cooperating with the sperical surfaces in the outboard bolt receiving openings of the respective splice bars, and a shear pin having a body portion interposed between the opposed ends of said wing spars and outstanding end flanges disposed in abutting relation to the side faces thereof.

11. An airplane wing spar joint construction comprising inboard and outboard wing spars disposed in end to end relation and separate connections therebetween, each of said connections comprising splice bars disposed on opposite sides of said wing spars and spanning the adjacent ends thereof, said adjacent ends of said wing spars having openings therein and said splice bars having openings in the ends thereof registering with the respective wing spar openings, the openings in the outboard ends of said splice bars having spherical surfaces, a bolt extending through the registering openings in said inboard wing spar and the inboard ends of said splice bars, eccentric bushings sleeved on said bolt and rotatable in the openings in the inboard ends of said splice bars, nuts on the outer ends of said bolt for clamping said bushings to said splice bars and the latter to said spars, arms fixed to said eccentric bushings for rotating the same in said splice bars and relative to said bolt, means for angularly adjusting said arms relative to said bushings, means for locking said arms to said splice bars, a bolt extending through the registering openings in said outboard spar and in the outboard ends of said splice bars, spherical bushings sleeved on said outboard bolt and cooperating with the sperical surfaces in the outboard bolt receiving openings of said splice bars, nuts on the outer ends of said outboard bolt for clamping said spherical bushings to said splice bars and the latter to said spars, and a shear pin having a body portion interposed between the opposed ends of said wing spars substantially in the plane of the inboard and outboard bolts of one of said separate spar connections and outstanding end flanges disposed in abutting relation to the opposite side faces of said spars.

12. An airfoil spar joint construction comprising two spars disposed in end to end relation and having opposed transverse grooves in their adjacent ends, splice bars disposed on opposite sides of said spars and extending across the adjacent ends thereof and the ends of the opposed grooves therein, separate connections between said splice bars and the respective spars, one of said connections including means for accommodating misalinement of said spars and the other of said connections including means for separately adjusting each of said splice bars relative to said spars to take up end play in said spar joint and to tension said splice bars, and a shear pin seated in said opposed grooves in said ends of said spars.

ALBERT UTSCH.

REFERENCES CITED

The following references are of record in the file of this patent:

UNITED STATES PATENTS

| Number | Name | Date |
|---|---|---|
| 1,941,348 | Hathorn | Dec. 26, 1933 |
| 1,097,185 | Oehrle | May 19, 1914 |
| 1,704,939 | Grauel | Mar. 12, 1929 |
| 132,287 | Hooker | Oct. 15, 1872 |
| 2,097,324 | Hill | Oct. 26, 1937 |